United States Patent
Chen et al.

(10) Patent No.: US 10,552,329 B2
(45) Date of Patent: Feb. 4, 2020

(54) SSD CACHING SYSTEM FOR HYBRID STORAGE

(71) Applicant: ProphetStor Data Services, Inc., Taichung (TW)

(72) Inventors: Wen Shyen Chen, Taichung (TW); Ming Jen Huang, Taichung (TW)

(73) Assignee: Prophetstor Data Services, Inc., Taichung (TW)

( * ) Notice: Subject to any disclaimer, the term of this patent is extended or adjusted under 35 U.S.C. 154(b) by 251 days.

(21) Appl. No.: 14/580,875

(22) Filed: Dec. 23, 2014

(65) Prior Publication Data

US 2016/0179683 A1 Jun. 23, 2016

(51) Int. Cl.
*G06F 3/06* (2006.01)
*G06F 12/0871* (2016.01)

(52) U.S. Cl.
CPC .. *G06F 12/0871* (2013.01); *G06F 2212/1021* (2013.01); *G06F 2212/217* (2013.01); *G06F 2212/222* (2013.01); *G06F 2212/281* (2013.01); *G06F 2212/608* (2013.01)

(58) Field of Classification Search
CPC ......... G06F 12/0871; G06F 2212/1021; G06F 2212/217; G06F 2212/222; G06F 2212/281; G06F 2212/608
See application file for complete search history.

(56) References Cited

U.S. PATENT DOCUMENTS

| 5,822,757 A | * | 10/1998 | Chi | G06F 9/383 711/129 |
| 2003/0140207 A1 | * | 7/2003 | Nagase | G06F 3/061 711/167 |
| 2011/0173395 A1 | * | 7/2011 | Bhattacharjee | G05D 23/19 711/135 |
| 2011/0264843 A1 | * | 10/2011 | Haines | G06F 12/0246 711/103 |
| 2014/0047190 A1 | * | 2/2014 | Dawkins | G06F 12/0813 711/136 |
| 2016/0054997 A1 | * | 2/2016 | Radhakrishnan | G06F 12/0862 711/137 |
| 2016/0253259 A1 | * | 9/2016 | Jin | G06F 12/1054 |

* cited by examiner

*Primary Examiner* — Kalpit Parikh
(74) *Attorney, Agent, or Firm* — Che-Yang Chen; Law Offices of Scott Warmuth

(57) ABSTRACT

A SSD caching system for hybrid storages is disclosed. The caching system for hybrid storages includes: a Solid State Drive (SSD) for storing cached data, separated into a Repeated Pattern Cache (RPC) area and a Dynamical Replaceable Cache (DRC) area; and a caching managing module, including: an Input/output (I/O) profiling unit, for detecting I/O requests for accesses of blocks in a Hard Disk Drive (HDD) during a number of continuously detecting time intervals, and storing first data corresponding to first blocks being repeatedly accessed at least twice in individual continuously detecting time intervals to the RPC area sequentially; and a hot data searching unit, for detecting I/O requests for accesses of a HDD during a independently detecting time interval, and storing second data corresponding to second blocks being accessed at least twice in the independently detecting time interval to the DRC area sequentially.

14 Claims, 5 Drawing Sheets

SSD CACHING SYSTEM FOR HYBRID STORAGE

FIELD OF THE INVENTION

The present invention relates to a SSD caching system. More particularly, the present invention relates to a SSD caching system for hybrid storages to achieve higher performance by storage provisioning mechanism.

BACKGROUND OF THE INVENTION

Conventionally, in order to settle the problem of high I/O latency as a result of random access workloads in data centers or enterprises, a larger and excessive number of disks may be deployed such that the increasing number of heads may reduce the chance of two consecutive reads on the same disk, and in turn to improve the access performance over the disks. However, there are several drawbacks due to the over deployment, e.g., increasing number of enclosures, extra amount of space, more power and cooling system for system operation, and higher maintenance costs, etc. Moreover, system-utilization rate may diminish as overfull capacity is added.

Recently, a solution is widely accepted by leveraging the fast read performance (random or sequential) of Solid State Drives (SSDs) along with Hard Disk Drives (HDDs). It is obvious that the storage system utilizing such solution is a hybrid storage. The SSD is used as a function of caching. Namely, only hot data (most frequently used data) are temporarily stored in the SSD for access. Once those stored data are not so "hot", they will be removed and the space is left for other hot data. Most non-hot data will be stored in HDDs. There are couples of benefits in such storage system. First, the SSD cache can provide higher peak performance value for peak requirement. Second, the SSD cache can be shifted among co-locating workloads in a virtual storage system environment. Third, pre-allocating hot data to SSD cache can lead agile response to performance requirements. In SSD cache shifting scenario, SSD cache may release soon-to-be-unused data in advance to shift SSD cache to other workloads, should other workloads be predicated or arisen periodically. Certainly the SSD cache can work for individual workload should its peak time is also predictable.

Although cache, both SSD and Random Access Memories (RAMs), has a great effect on storage performance when co-working with HDDs, SSD caches don't follow traditional RAM caching principles that its read is faster than write and sequential read/write is faster than random read/write. Most important of all, SSD will wear out after certain write cycles. Thus, control of conditions in applying SSD cache is an art when running over such hybrid storages.

There are some prior arts providing new techniques for the above requirement. For example, the US Patent Publication No. 20140244959 discloses a storage system having a control means for different types of storages. The storage system includes: a HDD storage; a SSD storage; and a storage controller that collects load information about respective loads in a number of areas in the HDD storage. It can select a candidate area in the HDD storage which is to be migrated, based on the collected load information, and migrate data in the selected candidate area to the SSD storage. The storage controller collects a count of input/output requests per unit time as the load information. It also selects the candidate area based on an average life expectancy from a duration time of that load. The average life expectancy may be further calculated by subtracting an elapse time of a load in each of the number of areas in the HDD storage. It is obvious that choosing of the data migrated to the SSD device is based on the duration that load information lasts. The system excludes periodically repeated loads which might not last for a long time but requested in a periodic and frequent pattern. Access of such repeated loads from the HDD will definitely harm the performance of the storage system.

In the US Patent Publication No. 20140258668, systems and methods for managing storage space in hybrid data storage systems are provided. The systems and methods of the application intelligently allocate data to SSDs (or other relatively high performance drives) and other data storage, such as, HDDs, based on data source, data type, data function or other like parameters. The intelligent allocation between at least one SSD and at least one other drive type allows for greater system performance through efficient use of storage space. The application adaptively uses the fastest necessary connected storage options in a hybrid data storage set to maintain maximum performance while most efficiently using minimum rewrites of data. Moreover, the allocation of data to storage in a hybrid data storage system may be controlled automatically or may be specifically set by users. Although many factors are taken into consideration in allocating data, hit ratio of the SSD can not be improved, which further limits the use of the SSD Therefore, in order to operate a hybrid storage well and effectively, a system to control use of a SSD cache along with other HDDs are required. Especially, the system is workable to improve hit ratio of the SSD and to achieve higher performance.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to settle the problems mentioned above, according to an aspect of the present invention, a SSD caching system for hybrid storages is disclosed. The SSD caching system includes: a Solid State Drive (SSD) for storing cached data, separated into a Repeated Pattern Cache (RPC) area and a Dynamical Replaceable Cache (DRC) area; and a caching managing module, comprising: an Input/output (I/O) profiling unit, for detecting I/O requests for accesses of blocks in a Hard Disk Drive (HDD) during a plurality of continuously detecting time intervals, and storing first data corresponding to first blocks being repeatedly accessed at least twice in individual continuously detecting time intervals to the RPC area sequentially; and a hot data searching unit, for detecting I/O requests for accesses of a HDD during an independently detecting time interval, and storing second data corresponding to second blocks being accessed at least twice in the independently detecting time interval to the DRC area sequentially.

According to the present invention, the SSD caching system further includes a writing-to-HDD module. It is used for directly storing the first data to one HDD if the first data is requested by write instructs and the I/O profiling unit finds that a first percentage of space of the RPC area were occupied with data. The first percentage is 90% or any percentage higher than 90%. Meanwhile, the writing-to-HDD module is further for directly storing the second data to one HDD if the second data is requested by write instructs and the I/O profiling unit finds that a second percentage of space of the DRC area were occupied with data. The second percentage is 90% or any percentage higher than 90%. Both the first and the second percentage are configurable values set by system administrators considering storage system characters, SLA or QoS combined together. 90% or higher than 90% is a preferred value.

The SSD caching system further includes a Random Access Memory (RAM) module, having an Area Virtual Table (AVT). The AVT is a mapping table keeping track of the block status in the first blocks and the second blocks. Logical blocks on the AVT are marked as DRC blocks if their corresponding mapping blocks in the SSD belong to DRC area; logical blocks on the AVT are marked as RPC blocks if their corresponding mapping blocks in the SSD belong to RPC area. When the I/O profiling unit finds one specified second data in the DRC area becomes a first data, the DRC blocks mapping to the specified second data in the DRC area is marked as RPC blocks while no change is made to the specified second data in the DRC area.

Preferably, when the I/O profiling unit finds that a group of first blocks were accessed repeatedly, the corresponding first data will be stored to the RPC area before the next time the first blocks are accessed. When the I/O profiling unit finds that a group of first blocks were not accessed repeatedly, the corresponding first data will be removed from the RPC area after the next time the first blocks are accessed. When a group of new first data and/or second data are predicted to be accessed in a specified point of time in the future, the I/O profiling unit flushes a portion of the space in the RPC area and/or a portion of the space in the RPC area. A cache replacement algorithm is employed by the hot data searching unit to flush a portion of the second data in the DRC area. The cache replacement algorithm is Least Recently Used (LRU) algorithm, Least Frequently Used (LFU) algorithm, or Adaptive Replacement Cache (ARC) algorithm. When hybrid storage encounters consistent high Input/output Operations Per Second (IOPS) and low cache hit ratio, the hot data searching unit stops storing second data requested by read instructions. The caching managing module and the writing-to-HDD module are in form of a card or an adaptor in a server, or software installed in a server.

The present invention takes advantages of separated RPC area and DRC area in the SSD to store (or cache) repeatedly and frequently used data, respectively. Other SSD cache mechanisms may miss repeatedly used data to be cached. It will degrade the performance of the whole hybrid storage. Thus, the present invention can operate a hybrid storage well and effectively. Most important of all, hit ratio of SSD cache can be improved.

DETAILED DESCRIPTION OF THE PREFERRED EMBODIMENT

The present invention will now be described more specifically with reference to the following embodiment.

Figure 1:
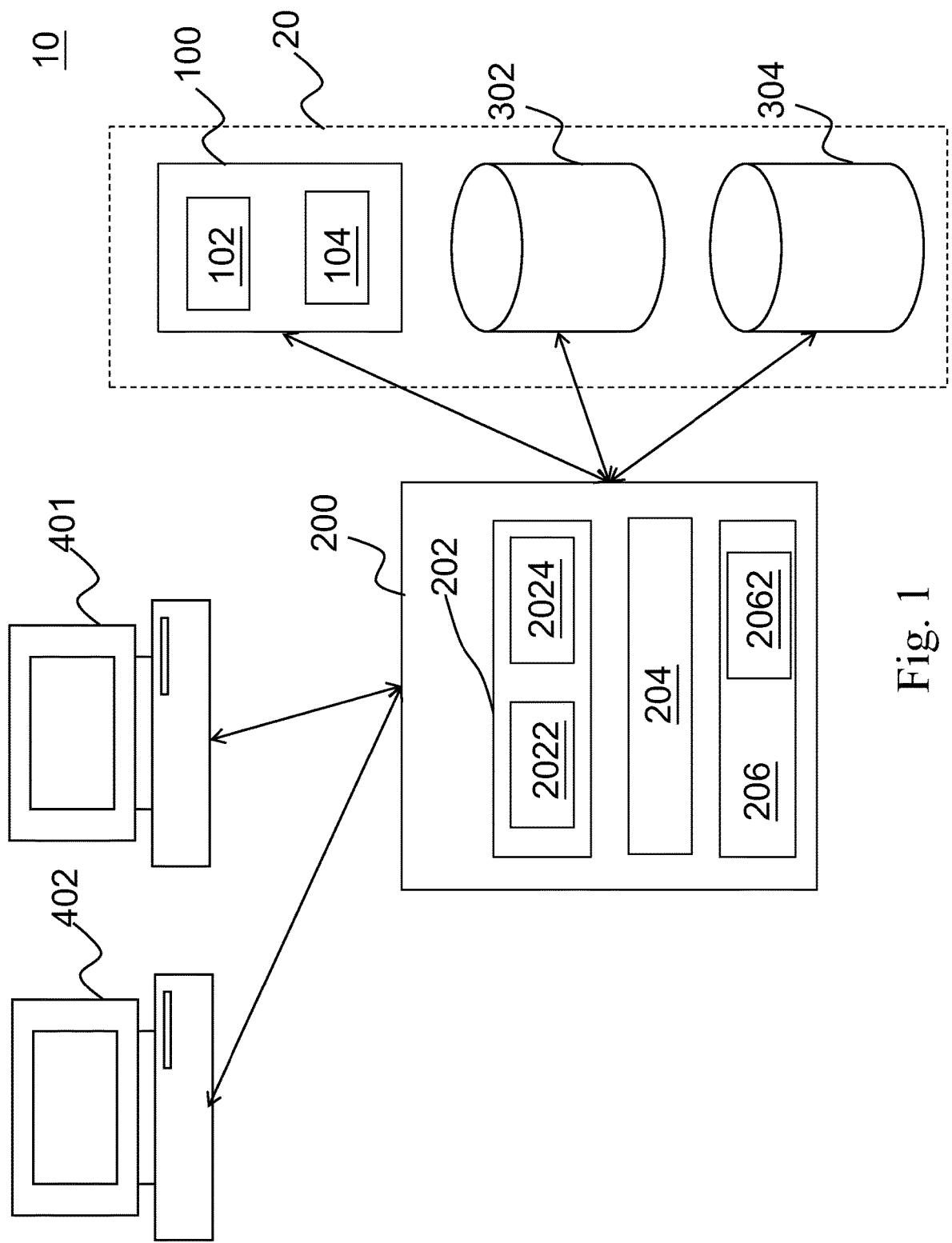
FIG. 1 is a schematic diagram of a caching system for hybrid storages according to the present invention.

Please refer to FIG. 1. An embodiment of the present invention is disclosed. A caching system 10 is used to improve performance of a hybrid storage 20. In this embodiment, the hybrid storage 20 is composed of a Solid State Drive (SSD) 100 and two Hard Disk Drives (HDDs) 302 and 304. According to the spirit of the present invention, the numbers of SSD and HDD are not limited to one and two, respectively. They can be any number according to the requirement that a system needs to run. The hybrid storage 20 may be formed as a Redundant Array of Independent Disks (RAID) in a data center. It can just be a Solid State Hard Drive (SSHD) in one single host. In this embodiment, the hybrid storage 20 is described as a RAID.

The caching system 10 includes the SSD 100 and a server 200. The caching system 10 is achieved by altering the original operation of the SSD 100. Therefore, any SSD in a hybrid storage having below data structure are considered an implementation of the present invention. The SSD 100 is separated into two areas, a Repeated Pattern Cache (RPC) area 102 and a Dynamical Replaceable Cache (DRC) area 104. The SSD 100 is used to store cached data, not all data from write instructs from application hosts 401 and 402. The RPC area 102 and the DRC area 104 also function to store cached data just different in category of the cached data.

The server 200 has a caching managing module 202, a writing-to-HDD module 204, and a Random Access Memory (RAM) module 206. Each of these elements is described in details below. The caching managing module 202 has an Input/output (I/O) profiling unit 2022 and a hot data searching unit 2024. The I/O profiling unit 2022 can detect I/O requests for accesses of blocks in the HDD 302 or 304. That is to say that the I/O profiling unit 2022 detects write instructs and read instructs to the HDD 302 or 304, and related blocks therein. The detecting processing lasts for several continuously detecting time intervals before the current moment. If there are first data corresponding to first blocks which had been repeatedly accessed at least twice in the individual continuously detecting time intervals, the first data are stored to the RPC area 102 sequentially. In order to have a better understanding of this point, please see FIG. 2.

Figure 2:
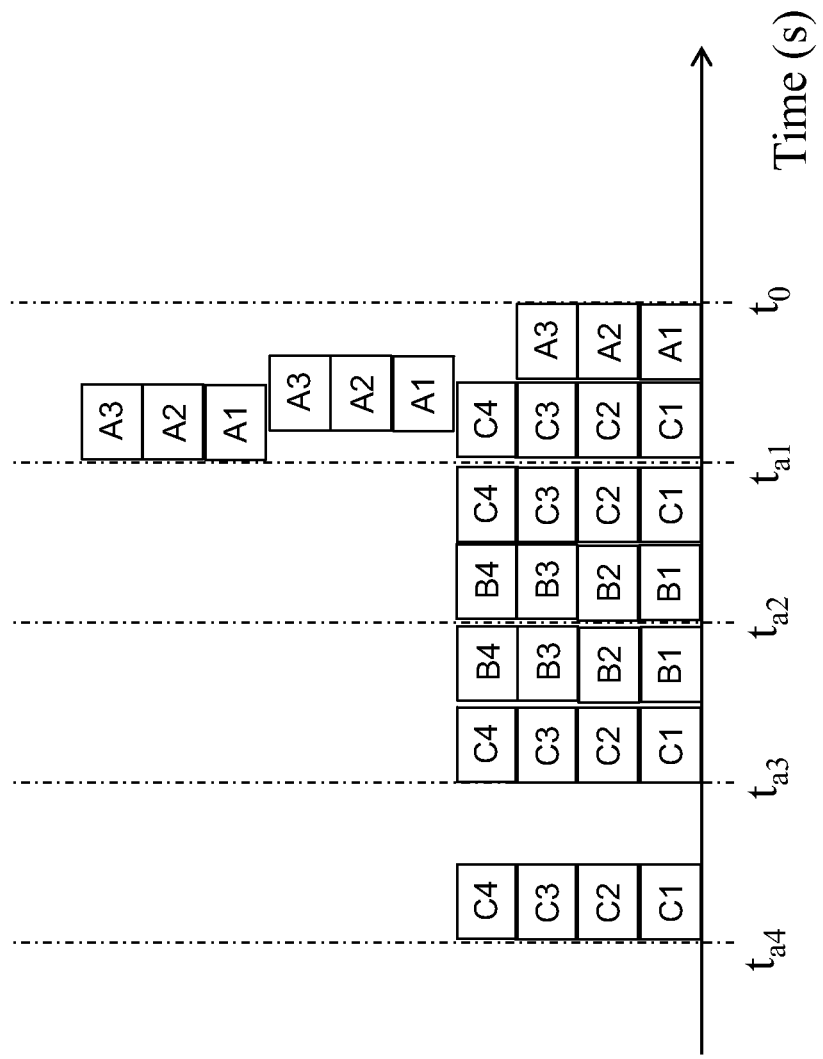
FIG. 2 depicts a record of blocks been accessed in continuously detecting time intervals.
Figure 2:
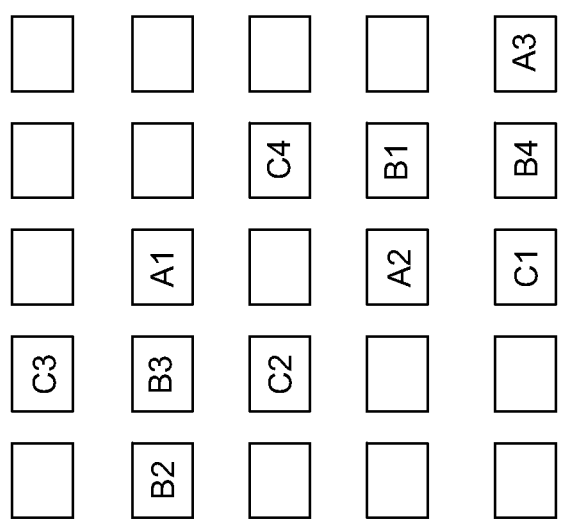

FIG. 2 depicts a record of blocks been accessed. On the left side of FIG. 2 shows an array of blocks in the HDD 302. There are only 25 blocks used for illustration. In fact, one HDD may contain thousands of blocks. FIG. 2 is an example for illustration purpose, not to limit the present invention. Some blocks are marked as A1, A2, A3, B1, B2, B3, B4, C1, C2, C3 and C4. They have been detected that they were accessed (here, it is obvious that read instructs received for "accesses", not write instructs. Generally, read instructs and write instructs are all applicable to the present invention). A1 to A3 represents a complete data. B1 and B2 represent one data and B3 and B4 represent another data while two data were accessed together. C1 to C4 represents another complete data. On the right side, a time series with blocks accessed is described. The time $t_0$ is the time now. Each of $t_{a1}$, $t_{a2}$, $t_{a3}$, and $t_{a4}$ is a point in the past. The time interval between any two adjacent time points is the continuously detecting time interval, e.g. the time interval between $t_{a2}$ and $t_{a3}$. It can be seen that A1, A2, and A3 were accessed three times during $t_{a1}$ to $t_0$. B1, B2, B3, and B4 were shown twice during $t_{a3}$ to $t_{a2}$ and $t_{a2}$ to $t_{a1}$. C1, C2, C3 and C4 were shown in every continuously detecting time intervals. If it is defined that all blocks accessed in every continuously detecting time intervals are considered first blocks and the corresponding first data can be cached (stored) to the RPC area 102 sequentially, C1, C2, C3 and C4 are all first blocks.

If it is defined that all blocks accessed in three continuously detecting time intervals are considered first blocks and the corresponding first data can be cached (stored) to the RPC area 102 sequentially, B1, B2, B3, B4, C1, C2, C3 and C4 are all first blocks. These first blocks are stored sequentially in the RPC area 102 for future sequential reads. Since it is required by the present invention that the blocks should be accessed at least twice in the individual continuously detecting time intervals, although A1, A2, and A3 are intensively accessed during $t_{a1}$ to $t_0$, they are not first blocks. Meanwhile, the minimum number of access can be changed according to any performance requirement of the hybrid storage 20. The continuously detecting time interval depends on workloads and definition on a Service Level Agreement (SLA) or a Quality of Service (QoS) requirement. Usually, it can be several seconds (heavy workload and higher performance requirement) to tens of minutes (light workload and low performance requirement).

Figure 3:
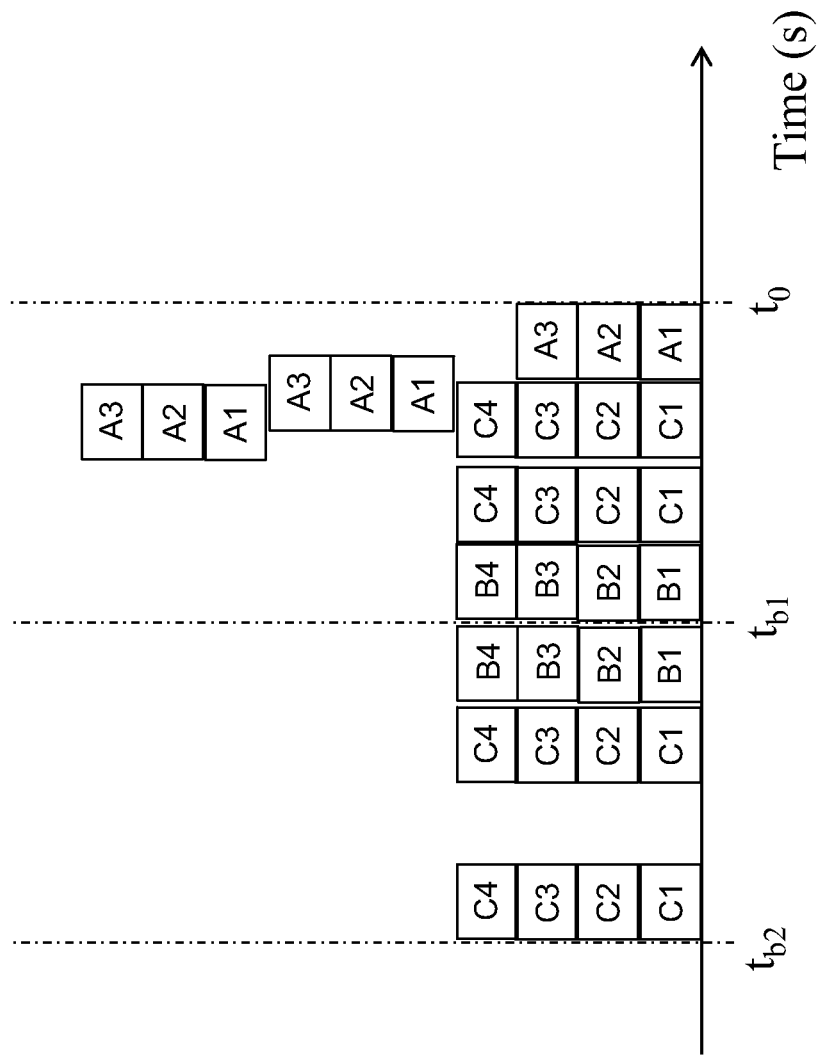
FIG. 3 depicts a record of blocks been accessed in independently detecting time intervals.
Figure 3:
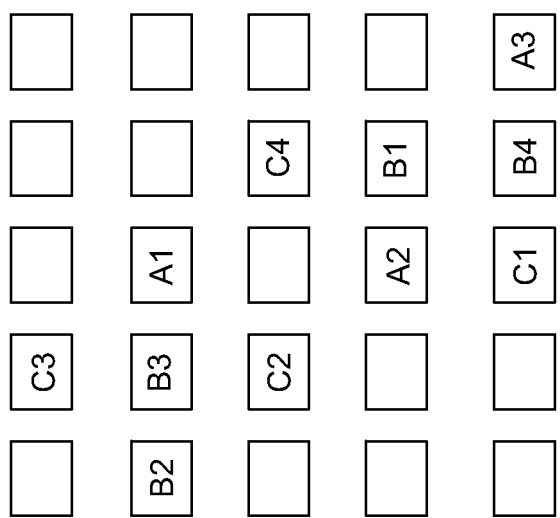

The hot data searching unit 2024 is used to detect I/O requests for accesses of a HDD during an independently detecting time interval. Similarly, the hot data searching unit 2024 detects write instructs and read instructs to the HDD 302 or 304, and related blocks therein. Different from the I/O profiling unit 2022, the hot data searching unit 2024 stores second data corresponding to second blocks being accessed at least twice in the independently detecting time interval to the DRC area 104 sequentially. Please refer to FIG. 3. Take the same accessed blocks in the HDD 302 in FIG. 2 for example. If the independently detecting time interval is as much as double the continuously detecting time interval (the time from $t_{a4}$ to $t_{a2}$ equals $t_{b2}$ to $t_{b1}$ and the time from $t_{a2}$ to $t_0$ equals $t_{b1}$ to $t_0$.), according to the definition, C1, C2, C3 and C4 are second blocks in the independently detecting time interval from $t_{b2}$ to $t_{b1}$ while A1, A2, A3, C1, C2, C3 and C4 are all second blocks in the independently detecting time interval from $t_{b1}$ to $t_0$. Of course, the independently detecting time interval is not necessary to be double of the continuously detecting time interval. There can be any quantitative relationship between the independently detecting time interval and the continuously detecting time interval.

The writing-to-HDD module 204 can directly store the first data to one HDD 302 or 304 if the first data is requested by write instructs and the I/O profiling unit 2022 finds the RPC area 102 is about to full. As discussed above, the first data stored in the RPC area 102 may come from write instructs or read instructs. For write cache, since the first data will finally write to the HDD 302 or 304, some first data fails to be stored in the RPC area 102 may not degrade the performance of the hybrid storage 20. This is because the first data directly stored in the HDD 302 or 304 may not be accessed in the future often. Thus, if the RPC area 102 is filled by write cache quickly or a first percentage of space of the RPC area 102 were occupied with data, the first data come later will be directly stored to the HDD 302 or 304. In practice, the first percentage can be 90% or any percentage higher than 90%. Similarly, the writing-to-HDD module 204 can also directly store the second data to the HDD 302 or 304 if the second data is requested by write instructs and the I/O profiling unit 2022 would find that the DRC area 104 is filled by write cache quickly or a second percentage of space of the DRC area 104 were occupied with data. The second percentage can also be 90% or any percentage higher than 90%. Both the first and the second percentage are configurable values set by system administrators considering storage system characters, SLA or QoS combined together. 90% or higher than 90% is a preferred value.

In order to improve the efficiency of the RPC area 102 and DRC area 104, the RAM module 206 applied with an Area Virtual Table (AVT) 2062 is provided. The AVT 2062 is a mapping table keeping track of the block status in the SSD 100 (RPC area 102 and DRC area 104). Logical blocks on the AVT 2062 are marked as DRC blocks if their corresponding mapping blocks in the SSD 100 belong to the DRC area 104. On the other hand, logical blocks on the AVT 2062 are marked as RPC blocks if their corresponding mapping blocks in the SSD 100 belong to the RPC area 102. When the I/O profiling unit 2022 finds one specified second data in the DRC area 104 becomes a first data, it is not necessary to remove the data from the DRC area 104 and re-write them to the RPC area 102. For the DRC blocks mapping to the specified second data in the DRC area 104, they can just be marked as RPC blocks directly. No change is made to the specified second data in the DRC area 104. Since RAM runs faster than the SSD 100, a small change in the RAM module 206 definitely benefits to the hybrid storage 20 which needs changes in both RPC area 102 and DRC area 104 with lower speed. The performance of the hybrid storage 20 can be improved this way.

It should be noticed that a cache replacement algorithm is employed by the hot data searching unit 2024 to flush a portion of the second data stored in the DRC area 104. This cache replacement algorithm is used to clear some less used second data in the DRC area 104 so that new required second data can be cached in the DRC area 104. There are several cache replacement algorithms may be used. For example, Least Recently Used (LRU) algorithm, Least Frequently Used (LFU) algorithm, or Adaptive Replacement Cache (ARC) algorithm may be used. Different usage scenarios require different algorithms. An algorithm used by the hot data searching unit 2024 in the DRC area 104 can be chosen from the cache replacement algorithm according to different usage of storage, or stopped applying to read or write instructs.

Depending on different usages, each algorithm would have some scenarios showing better performance than others. The problem is that the requests for the hybrid storage 20 are unknown and there are too many environment variables. But a phenomenon can tell the currently used cache replacement algorithm is ineffective. For example, if the hybrid storage 20 (or the DRC area 104) encounters consistent high Input/output Operations Per Second (IOPS) and low cache hit ratio, it is implied that an ineffective selection of a cache replacement algorithm is applied. Thus, the hot data searching unit 2024 will stop storing second data requested by read instructs. Another cache replacement algorithm will take over. It is to say that the read cache is temporarily stopped while write cache may not be affected.

Figure 4:
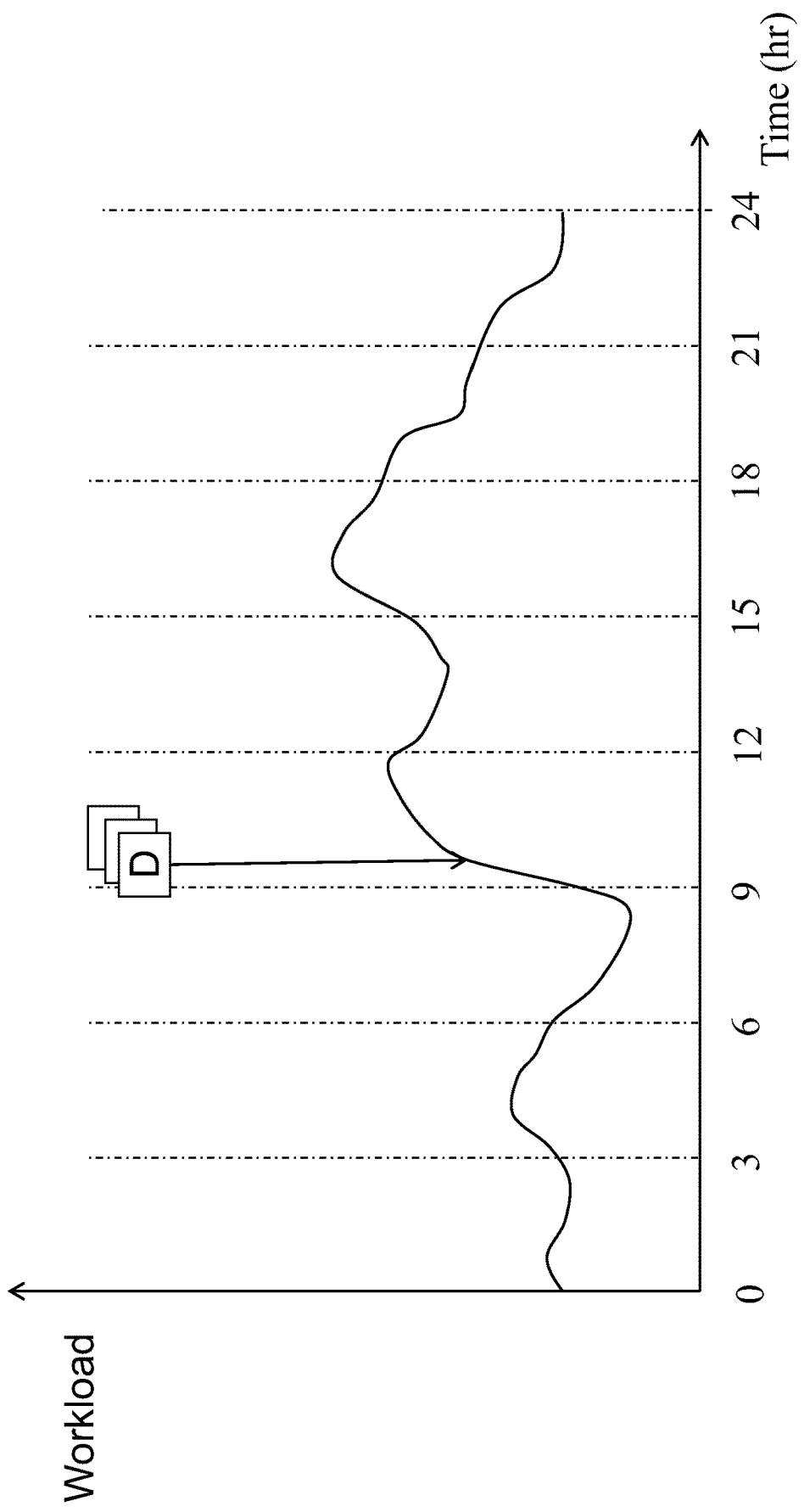
FIG. 4 shows a workload distribution of a hybrid storage in weekdays.

According to the spirit of the present invention, the I/O profiling unit 2022 can adjust cached data in the DRC area 104 before some predictable (or repeated) condition appears. Please see FIG. 4. It is a workload distribution of the hybrid storage 20 in weekdays. A workload requested from the application hosts 401 and 402 shows that there is a sharp increase of the workload around 9:00. It may be caused by employees online to work that they need data from the server 200. A group of first blocks D was detected that they are accessed at this stage repeatedly every weekdays. Of course, if the group of first blocks D is stored in the HDD 302, when people request accesses thereof and nothing changes, IOPS will get high while latency follows. Therefore, when the I/O profiling unit 2022 finds the group of first blocks D was accessed repeatedly, the corresponding first data will be stored to the RPC area 102 before the next time the first blocks are accessed. For example, the first data will be stored to the RPC area 102 on 8:30 every weekday. It is to say the data are pre-fetched into the RPC area 102 based on I/O profiler unit 2022 rather than waiting the cache replacement algorithm of the hot data searching unit 2024 dynamically updating the DRC area 104.

Figure 5:
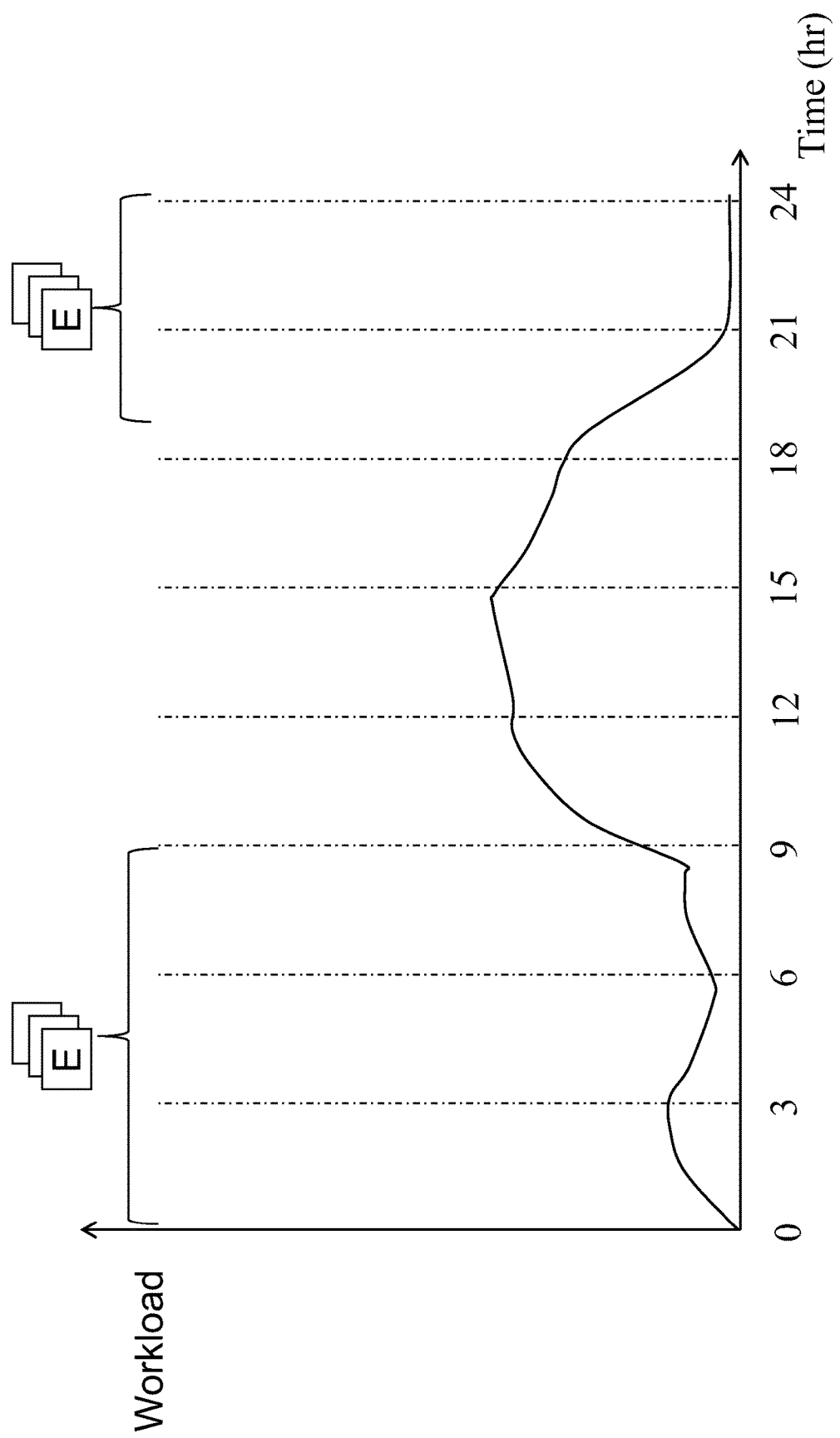
FIG. 5 shows another workload distribution of a hybrid storage in weekdays.

On the contrary, if the I/O profiling unit 2022 finds that a group of first blocks were "not" accessed repeatedly (they must be accessed repeatedly sometimes), the corresponding first data will be removed from the RPC area 102 after the next time the first blocks are accessed. Please refer to FIG. 5. This figure shows another workload to the hybrid storage 20. It is clear that this workload is heavy from 9:00 to 21:00. During this time, a group of first blocks E is observed not to be accessed. Therefore, the group of first blocks E will be removed. For example, it is removed from 8:50 the other day. Pre-evicting stored data can provide other workloads more space of cache in the DRC area 104.

The above examples of the present embodiment are based on historically detected information. If workloads can be predicted or given, the present invention can also be applied. In other words, when a group of new first data and/or second data are predicted to be accessed in a specified point of time in the future, the I/O profiling unit 2022 flushes a portion of the space in the RPC area 102 and/or a portion of space in the DRC area 104. Thus, new first data and/or second data can be stored at predicted moment. Any suitable methods, algorithms, or modules that provide such prediction can be applied. It is best to utilize a storage traffic modeling system provided by the same inventor in US patent application Ser. No. 14/290,533. Co-reference of the same techniques can be acquired from the application. The size of flushed space in the RPC area 102 and/or DRC area 104 should depend on the amount of the workload.

It should be noticed that the caching managing module 202 and the writing-to-HDD module 204 are in form of a card or an adaptor in the server 200 in the present embodiment. In fact, they can be implemented by software installed in the server 200.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A SSD caching system for hybrid storages, comprising:
  a Solid State Drive (SSD) for storing cached data, separated into a Repeated Pattern Cache (RPC) area and a Dynamical Replaceable Cache (DRC) area; and
  a caching managing module, comprising:
    an Input/output (I/O) profiling unit, for detecting I/O requests for accesses of blocks in a Hard Disk Drive (HDD) during a predetermined period which includes a plurality of time intervals, pre-storing a first data corresponding to first blocks being repeatedly accessed in each of at least two separate time intervals to the RPC area of the SSD sequentially before a specified point of time in the future when the I/O profiling unit predicts that the first data will be accessed in the specified point of time in the future, and removing the first data from the RPC area of the SSD when the I/O profiling unit predicts that the first data will not be accessed repeatedly; and
    a hot data searching unit, for detecting I/O requests for accesses of blocks in the HDD during a specific time interval, and storing a second data corresponding to second blocks being accessed at least twice in the specific time interval to the DRC area of the SSD sequentially.

2. The SSD caching system according to claim 1, further comprising a writing-to-HDD module, for directly storing the first data to the HDD if the first data is requested by write instructions and the I/O profiling unit finds that a first percentage of space of the RPC area were occupied with data.

3. The SSD caching system according to claim 2, wherein the first percentage is 90% or any percentage higher than 90%.

4. The SSD caching system according to claim 2, wherein the writing-to-HDD module is further for directly storing the second data to the HDD if the second data is requested by write instructions and the I/O profiling unit finds that a second percentage of space of the DRC area were occupied with data.

5. The SSD caching system according to claim 4, wherein the second percentage is 90% or any percentage higher than 90%.

6. The SSD caching system according to claim 2, wherein the caching managing module and the writing-to-HDD module are in form of a card or an adaptor in a server, or software installed in a server.

7. The SSD caching system according to claim 1, further comprising a Random Access Memory (RAM) module, having an Area Virtual Table (AVT), wherein the AVT is a mapping table keeping track of the block status in the first blocks and the second blocks; logical blocks on the AVT are marked as DRC blocks if their corresponding mapping blocks in the SSD belong to DRC area; logical blocks on the AVT are marked as RPC blocks if their corresponding mapping blocks in the SSD belong to RPC area; when the I/O profiling unit finds one specified second data in the DRC area becomes a first data, the DRC blocks mapping to the specified second data in the DRC area is marked as RPC blocks while no change is made to the specified second data in the DRC area.

8. The SSD caching system according to claim 1, wherein when the I/O profiling unit finds that a group of first blocks were accessed repeatedly, the corresponding first data will be stored to the RPC area before the next time the first blocks are accessed.

9. The SSD caching system according to claim 1, wherein when the I/O profiling unit finds that a group of first blocks were not accessed repeatedly, the corresponding first data will be removed from the RPC area after the next time the first blocks are accessed.

10. The SSD caching system according to claim 1, wherein when a group of new first data and/or second data are predicted to be accessed in a specified point of time in the future, the I/O profiling unit flushes a portion of the space in the RPC area and/or a portion of the space in the DRC area.

11. The SSD caching system according to claim 1, wherein a cache replacement algorithm is employed by the hot data searching unit to flush a portion of the second data in the DRC area.

12. The SSD caching system according to claim 11, wherein the cache replacement algorithm is Least Recently Used (LRU) algorithm, Least Frequently Used (LFU) algorithm, or Adaptive Replacement Cache (ARC) algorithm.

13. The SSD caching system according to claim 12, wherein an algorithm used by the hot data searching unit in the DRC area is chosen from the cache replacement algorithms according to different usage of the hybrid storages, or stopped applying to read or write instructions.

14. The SSD caching system according to claim 11, wherein when the hybrid storage encounters consistent high Input/output Operations Per Second (IOPS) and cache hit ratio is below a predetermined value, the hot data searching unit stops storing second data requested by read instructions.

* * * * *